(12) United States Patent
Chang

(10) Patent No.: US 7,920,221 B2
(45) Date of Patent: Apr. 5, 2011

(54) BACKLIGHT ASSEMBLY AND LIQUID CRYSTAL DISPLAY HAVING THE SAME

(75) Inventor: Woong-jae Chang, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 180 days.

(21) Appl. No.: 11/777,974

(22) Filed: Jul. 13, 2007

(65) Prior Publication Data
US 2008/0252808 A1 Oct. 16, 2008

(30) Foreign Application Priority Data
Jul. 19, 2006 (KR) .................. 10-2006-0067490

(51) Int. Cl.
G02F 1/1333 (2006.01)
F21V 21/00 (2006.01)

(52) U.S. Cl. ............... 349/58; 362/225; 362/217.11

(58) Field of Classification Search .................. None
See application file for complete search history.

(56) References Cited

U.S. PATENT DOCUMENTS
| | | | |
|---|---|---|---|
| 2001/0002145 A1 | 5/2001 | Lee et al. | |
| 2003/0234896 A1* | 12/2003 | Kim | 349/65 |
| 2005/0162868 A1 | 7/2005 | Kim | |
| 2006/0050195 A1 | 3/2006 | Choi et al. | |
| 2007/0002206 A1* | 1/2007 | Shirai | 349/58 |

FOREIGN PATENT DOCUMENTS
| | | |
|---|---|---|
| CN | 1303021 A | 7/2001 |
| CN | 1746734 A | 3/2006 |
| JP | 2002006758 | 1/2002 |
| KR | 10-1998-0036431 | 4/1998 |
| KR | 1020040046873 | 5/2004 |

OTHER PUBLICATIONS

Patent Abstract of Korea, Publication No. 10-2000-0018704 A, Apr. 6, 2004, 1 p.
EPO Search Report corresponding to EP Application No. 07014077.7, Jun. 30, 2008, 8 pp.

* cited by examiner

*Primary Examiner* — Omar Rojas
(74) *Attorney, Agent, or Firm* — Innovation Counsel LLP

(57) ABSTRACT

A backlight assembly which includes a first mold comprising a frame including a plurality of side portions defining an opening; and a light source disposed in the opening, wherein an external surface of the side portions includes a reverse-inclined surface extending downwardly and inwardly from an upper portion of the external surface and a width of the side portions is smaller at the upper portion and becomes larger downwardly.

22 Claims, 15 Drawing Sheets

BACKLIGHT ASSEMBLY AND LIQUID CRYSTAL DISPLAY HAVING THE SAME

CROSS-REFERENCE TO RELATED APPLICATION

This application claims priority from Korean Patent Application No. 10-2006-0067490 filed on Jul. 19, 2006 in the Korean Intellectual Property Office, the disclosure of which is incorporated herein by reference in its entirety.

BACKGROUND OF THE INVENTION

1. Field of the Invention

The present invention relates to a backlight assembly and a liquid crystal display having the same, and more particularly, to a backlight assembly having an increased receiving space for receiving a printed circuit board, and a liquid crystal display having the same.

2. Description of the Related Art

Liquid crystal displays are one of the most commonly used flat panel displays. Liquid crystal displays, which include two panels having a plurality of electrodes arranged thereon and a liquid crystal layer interposed between the two panels, control the transmittance of incident light by applying voltages to the electrodes to rearrange liquid crystal molecules of the liquid crystal layer.

A backlight assembly is disposed below a liquid crystal display panel to supply the liquid crystal display panel with light and a printed circuit board (PCB) is attached to one side of the liquid crystal display panel to drive the liquid crystal display panel. The liquid crystal display panel is disposed above the backlight assembly and received in a top chassis.

The top chassis covers the edges of the liquid crystal display panel and surrounds lateral surfaces of the liquid crystal display panel and the backlight assembly. A predetermined gap is created between the backlight assembly and the top chassis and the PCB is accommodated in a space corresponding to the gap. Here, the dimensions of the space accommodating the PCB depend upon the height of a driving chip mounted on the PCB. Accordingly, the gap between the backlight assembly and the top chassis should be greater than the sum of the thickness of the PCB and the height of the driving chip. However, as the gap between the backlight assembly and the top chassis increases, although a display area remains the same size, a liquid crystal display may become unnecessarily bulky. In particular, in a case where one frame image is formed based on, for example, a tiled monitor type liquid crystal display in which a plurality of liquid crystal display panels are arranged adjacent to one another, a view may be dissatisfied with image quality due to a variance in the non-display area of the entire liquid crystal display, which may be caused by a relatively large distance between the displays of liquid crystal display panel.

SUMMARY OF THE INVENTION

The present invention provides a backlight assembly which can reduce the dimension of a non-display area.

The present invention also provides a liquid crystal display having a non-display area with reduced dimension.

These and other objects of the present invention will be described in or be apparent from the following description of the preferred embodiments.

According to an aspect of the present invention, there is provided a backlight assembly including a light source, and a first mold receiving the light source and having the shape of an open window frame, wherein in at least one side portion, an external surface of a side wall of the first mold has at least one reverse-inclined surface extending downwardly at an angle toward the interior side of the side wall.

According to another aspect of the present invention, there is provided a backlight assembly including a light source, and a first mold receiving the light source and having the shape of an open window frame, wherein in at least one side portion, an external surface of a side wall of the first mold has an undercut surface that is cut inwardly from its outermost surface.

According to still another aspect of the present invention, there is provided a backlight assembly including a light source, a first mold receiving the light source and having the shape of an open window frame, wherein the first mold includes a side wall, an upper surface connected to the side wall, a sloping surface that extends from the upper surface and is inclined downwardly toward the interior side of the side wall, and a bottom surface that is opened in at least one side portion, and a bottom chassis disposed under the light source and receiving a reflection sheet, wherein the reflection sheet extends from the opened bottom surface of the first mold and inserted between the side wall of the first mold and the sloping surface of the first mold.

According to a further aspect of the present invention, there is provided a liquid crystal display including a liquid crystal display panel assembly including a liquid crystal display panel, a data tape carrier package (TCP) attached to at least one side portion of the liquid crystal display panel, and a printed circuit board (PCB) which is attached to the data TCP and on which at least one driver chip is mounted, a backlight assembly including a light source providing the liquid crystal display panel with light, and a first mold receiving the light source and having the shape of an open window frame, wherein in at least one side portion, an external surface of a side wall of the first mold has at least one reverse-inclined surface extending downwardly at an angle toward interior side of the side wall, and a top chassis covering edges of the liquid crystal display panel and surrounding lateral surfaces of the liquid crystal display panel and the backlight assembly, wherein the PCB is received in a space defined by a reverse-inclined surface of the first mold in the at least one side portion and the top chassis.

According to yet another aspect of the present invention, there is provided a liquid crystal display including a liquid crystal display panel assembly including a liquid crystal display panel, a data tape carrier package (TCP) attached to at least one side portion of the liquid crystal display panel, and a printed circuit board (PCB) which is attached to the data TCP and on which at least one driver chip is mounted, a backlight assembly including a light source providing the liquid crystal display panel with light, and a first mold receiving the light source and having the shape of an open window frame, wherein in at least one side portion, an external surface of a side wall of the first mold has a first undercut surface that is cut inwardly from its outermost surface, and a top chassis covering edges of the liquid crystal display panel and surrounding lateral surfaces of the liquid crystal display panel and the backlight assembly, wherein the PCB is received in a space defined by the first undercut surface of the first mold in the at least one side portion and the top chassis.

According to another aspect of the present invention, there is provided a liquid crystal display including a liquid crystal display panel assembly including a liquid crystal display panel, a data tape carrier package (TCP) attached to at least one side portion of the liquid crystal display panel, and a printed circuit board (PCB) which is attached to the data TCP and on which at least one driver chip is mounted, a backlight assembly including a light source providing the liquid crystal display panel with light, a first mold including a side wall, an upper surface connected to the side wall, a sloping surface that extends from the upper surface and is inclined downwardly toward the interior side of the side wall, and a bottom surface that is opened in at least one side portion, a bottom chassis disposed under the light source and receiving a reflection sheet, wherein the bottom chassis is inserted between the side wall of the first mold and the sloping surface of the first mold, and a top chassis covering edges of the liquid crystal display panel and surrounding lateral surfaces of the liquid crystal display panel and the backlight assembly.

BRIEF DESCRIPTION OF THE DRAWINGS

The above and other features and advantages of the present invention will become more apparent by describing in detail preferred embodiments thereof with reference to the attached drawings, in which.

DETAILED DESCRIPTION OF THE INVENTION

Figure 1:
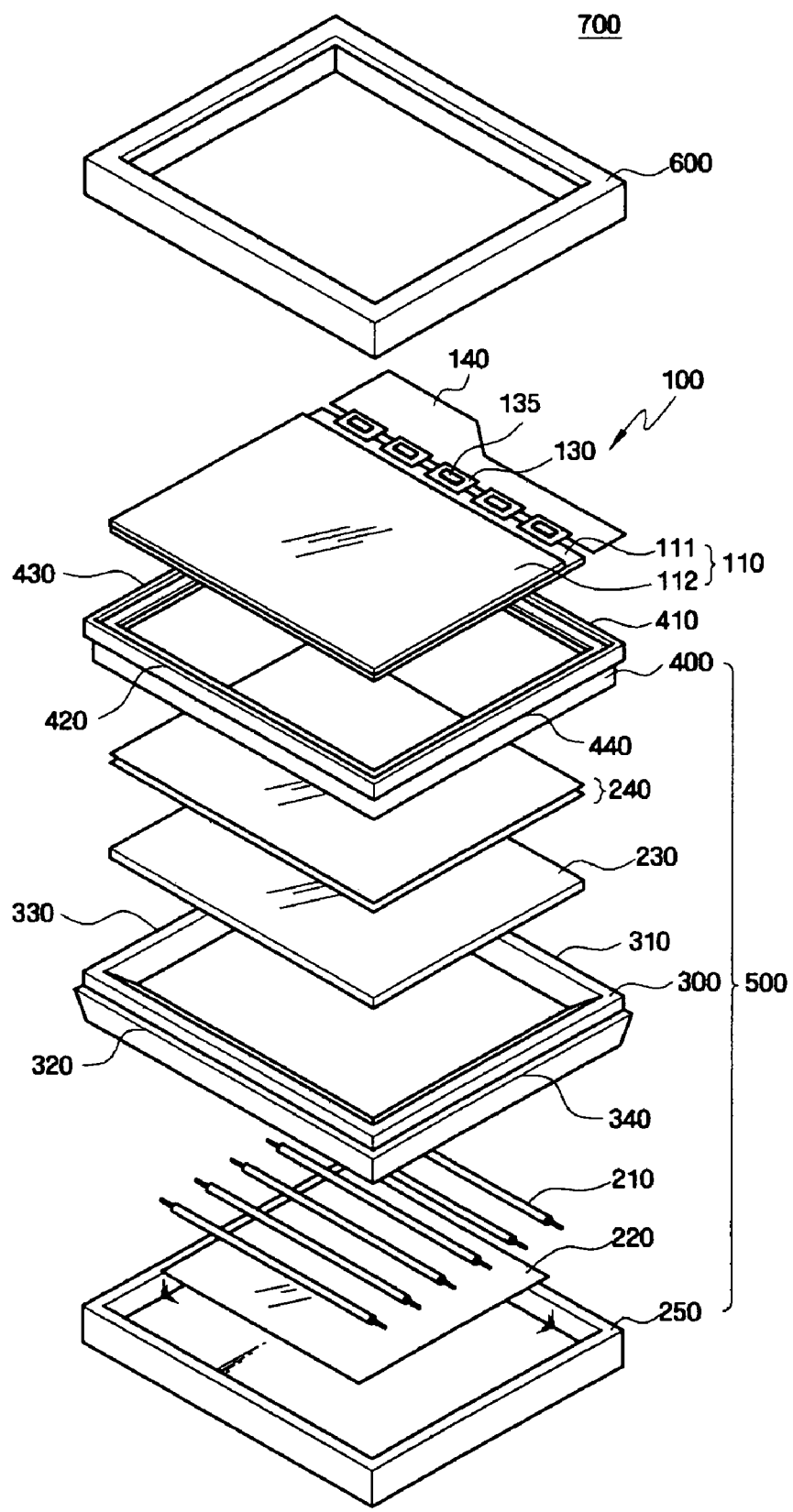
FIG. 1 is an exploded perspective view of a liquid crystal display according to a first embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. In addition, in the drawings, the thickness of layers and regions are exaggerated for clarity.

In the following description, it will be understood that when an element or a layer is referred to as being "on" another element or layer, it can be directly on the other element or layer, or intervening layers or elements may also be present. In contrast, when an element is referred to as being "directly on" another element, there are no intervening elements present. Like reference numerals refer to like elements throughout the specification. The terms "and/or" comprises each and at least one combination of referenced items.

Spatially relative terms, such as "below", "beneath", "lower", "above", "upper" and the like, may be used herein for ease of description to describe one element or feature's relationship to another element(s) or feature(s) as illustrated in the figures. It will be understood that spatially relative terms are intended to encompass different orientations of the device in use or operation in addition to the orientation depicted in the figures.

The present invention will be described with reference to perspective views, cross-sectional views, and/or plan views, in which preferred embodiments of the invention are shown. Thus, the profile of an exemplary view may be modified according to manufacturing techniques and/or allowances. That is, the embodiments of the invention are not intended to limit the scope of the present invention but cover all changes and modifications that can be caused due to a change in manufacturing process. For example, while an etched region is illustrated as a rectangular shape, it may be rounded or have a predetermined curvature. Thus, regions shown in the drawings are illustrated in schematic form and the shapes of the regions are presented simply by way of illustration and not as a limitation.

Thin film transistor (TFT) substrates according to embodiments of the present invention will now be described in detail with reference to the accompanying drawings.

Figure 2:
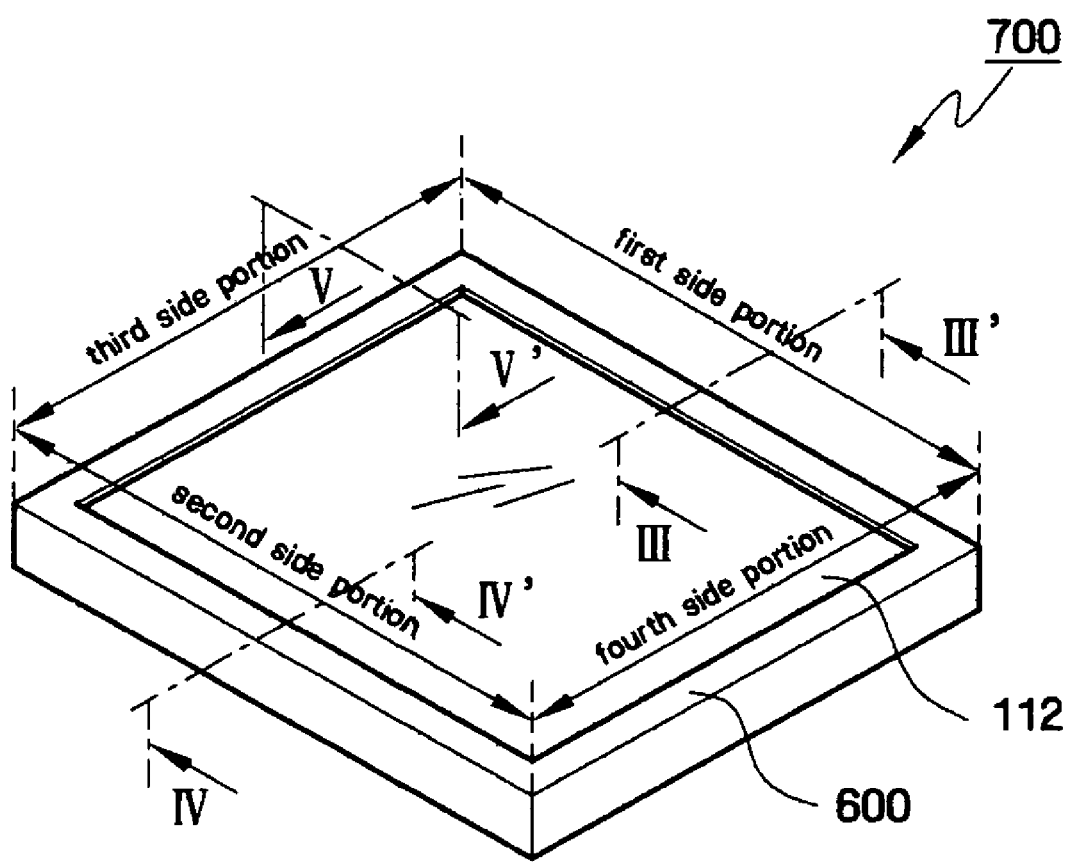
FIG. 2 is a perspective view of the liquid crystal display shown in FIG. 1.

FIG. 1 is an exploded perspective view of a liquid crystal display (700) according to a first embodiment of the present invention and FIG. 2 is a cross-sectional view of the liquid crystal display shown in FIG. 1 in an assembled condition. As shown in FIG. 2, the liquid crystal display according to the current embodiment substantially has the shape of a rectangular block and has four side portions in total. Throughout this specification, for simplicity of explanation, a side portion to which a data tape carrier package (TCP) and a PCB are attached is defined as a first side portion, a side portion facing the first side portion is defined as a second side portion, and side portions adjacent to the first and second side portions are defined as a third side portion and a fourth side portion, respectively.

Referring to FIGS. 1 and 2, the liquid crystal display 700 includes a liquid crystal display (LCD) panel assembly 100, a backlight assembly 500, and a top chassis 600.

The LCD panel assembly 100 includes a LCD panel 110 having a first substrate 111, a second substrate 112, and a liquid crystal layer (not shown) formed between the first substrate 111 and the second substrate 112; a data TCP 130 attached to the first side portion of the LCD panel 110, and a PCB 140 attached to the data TCP 130. A data driver integrated circuit (IC) 135 is mounted on the data TCP 130 and at least one driver chip (see 141 of FIG. 3) is mounted on the PCB 140. The first substrate 111 may be larger than the second substrate 112 so as to provide an attachment surface for the data TCP 130 to attach to. A plurality of gate lines (not shown) and a plurality of data lines (not shown) are formed on the first substrate 111 and the data lines are driven by driving chips (see 141 of FIG. 3) on the PCB 140 and the data driver IC 135.

The backlight assembly 500 includes a light source 210, a reflection sheet 220 reflecting light emitted from the light source 210, and an optical plate 230 and an optical sheet layer 240 adjusting optical characteristics of the emitted light.

The light source 210 may be, but is not limited to, a linear light source such as a cold cathode fluorescent lamp (CCFL), a hot cathode fluorescent lamp (HCFL), or an external electrode fluorescent lamp (EEFL), a point light source such as a light emitting diode (LED), and any other type of light source, so long as it can provide the LCD panel assembly 100 with light. In the following examples, the invention is described with regard to the light source 210 using a linear light source as an example, and a plurality of light sources arranged in parallel with each other are illustrated.

The reflection sheet 220 is disposed below the light source 210 and reflects light upward from below the light source 210.

The optical plate 230 and the optical sheet layer 240 are disposed above the light source 210. The optical plate 230 diffuses the light incident from the light source 210. The optical sheet layer 240 propagates, polarizes or focuses the incident light. The optical sheet layer 240 may be formed of a combination of two or more optical sheets having the functions stated previously, for example, a diffusion sheet, a prism sheet, or the like. If necessary, the optical sheet layer 240 may further include a protective sheet.

The backlight assembly 500 includes a bottom chassis 250, a first mold 300, and a second mold 400. The bottom chassis 250 receives or accommodates the light source 210, the reflection sheet 220, the optical plate 230 and the optical sheet layer 240.

The reflection sheet 220 is received by the bottom chassis 250 and the light source 210 is disposed on the bottom surface of the bottom chassis 250. The reflection sheet 220 has a substantially rectangular shape. The optical plate 230 and the optical sheet layer 240 are housed inside an internal space defined by the first mold 300 and the second mold 400. The LCD panel assembly 100 is disposed over the second mold 400.

The first mold 300 includes a third and a fourth side portion 330 and 340 for receiving the light source 210, and a first and a second side portion 310 and 320, which are not associated with receiving of the light source 210. The first through fourth side portions 310 through 340 are integrally connected to each other. In other words, the first mold 300 is formed as a single piece frame having an open window at the center. Since the first mold 300 is formed as the single piece frame, it can be assembled in a simplified manner and the backlight assembly 500 shows increased resistance against external shock. The first mold 300 may be formed by injection molding a resin or the like.

The second mold 400 is disposed above the first mold 300. Like the first mold 300, the second mold 400 includes first through fourth side portions 410 through 440. The second mold 400 is also formed as a single piece frame having an open window at the center.

The top chassis 600 covers the edges of the LCD panel 110 and surrounds lateral surfaces of the LCD panel 110 and the backlight assembly 500. The top chassis 600 may be combined with at least one selected from the bottom chassis 250, the first mold 300, and the second mold 400 by, but not limited to, a hook or screw connection method.

Next, the liquid crystal display will be described in greater detail with regard to the connecting and receiving relationship of the respective side portions.

Figure 3:
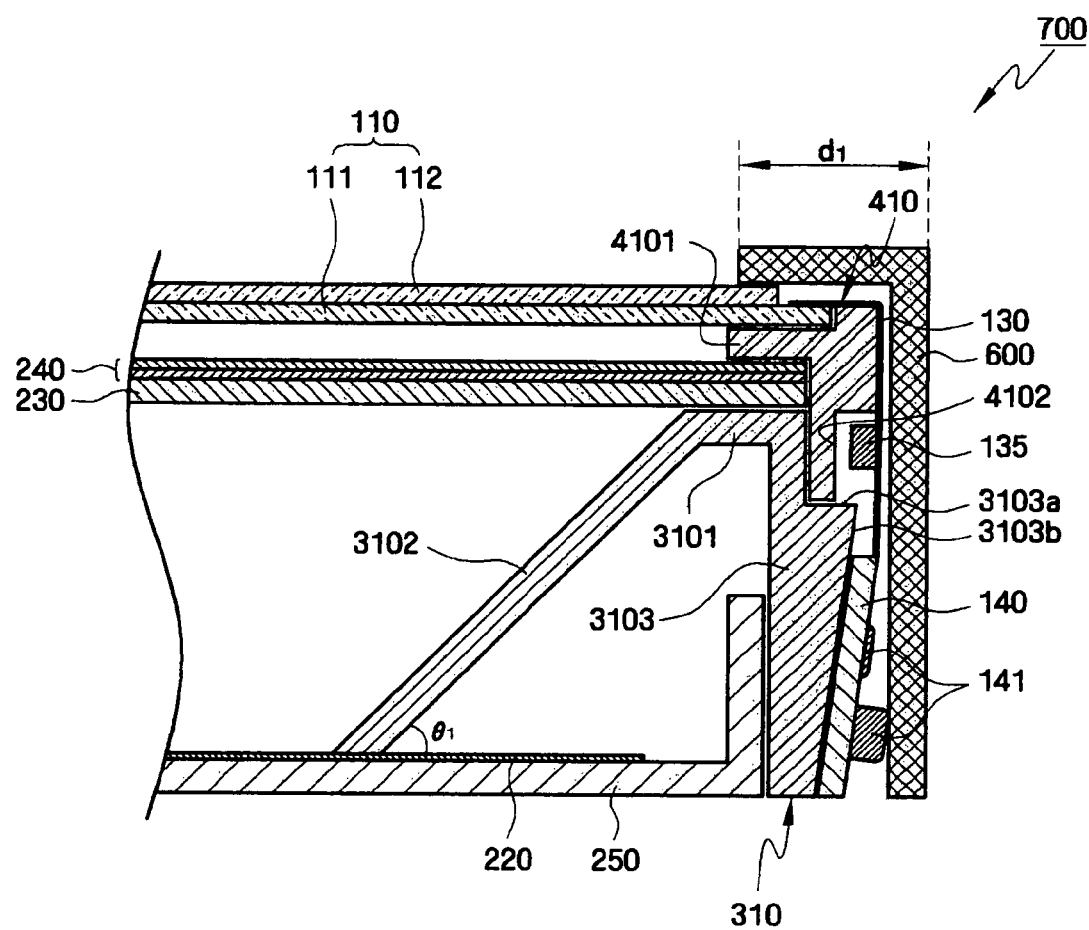
FIG. 3 is a cross-sectional view taken along line III-III' of FIG. 2, illustrating a first side portion of the liquid crystal display shown in FIG. 1.

FIG. 3 is a cross-sectional view taken along line III-III' of FIG. 2, illustrating a first side portion of the liquid crystal display 700 shown in FIG. 1. Referring to FIGS. 1 through 3, the bottom chassis 250 forms the lowermost surface of the liquid crystal display 700. The bottom chassis 250 includes a bottom surface and side walls. One end of a side wall of the bottom chassis 250 is inserted between a sloping portion 3102 and a side wall 3103 of the first side portion 310 in the first mold 300 so that it comes into contact with the internal surface of the side wall 3103. The PCB 140 is inserted into a space beside the exterior surface of the side wall 3103, which will later be described. Since the side wall of the bottom chassis 250 is positioned inwards with respect to the side wall 3103 of the first side portion 310 in the first mold 300, which is not involved with the receiving space for receiving the PCB 140, it is not necessary to increase in the receiving space. Thus, in this case, a dimension $d_1$ of the top surface of the top chassis 600 is reduced, compared to a case where the side wall of the bottom chassis 250 is on the outside of the side wall 3103 of the first side portion 310 in the first mold 300.

As shown in FIG. 1, the backlight assembly 500 can have sufficient resistance against external shock because of the first mold 300 having four side portions shaped as a single-piece frame. Accordingly, the sidewalls of the bottom chassis 250 can be formed in a simple straight arrangement without any particular shock-absorbing member.

The reflection sheet 220 is disposed on the bottom surface of the bottom chassis 250. One end of the reflection sheet 220 extends between the sloping surface 3102 of the first mold 300.

The first side portion 310 in the first mold 300 includes an upper surface 3101, the sloping surface 3102 and the side wall 3103. The upper surface 3101 of the first mold 300 supports the optical plate 230 and the optical sheet layer 240. The sloping surface 3102 of the first mold 300 is inclined downwardly from the upper surface 3101. The lower end of the sloping surface 3102 of the first mold 300 presses on reflection sheet 220, thereby helping to prevent movement of the reflection sheet 220. The sloping surface 3102 of the first mold 300 may serve to reflect light emitted from the light source 210. To this end, the first mold 300 may be made of a resin having a good reflective property. Alternatively, a reflective material may be applied to the sloping surface 3102 of the first mold 300. To provide sufficient reflection efficiency, the sloping surface 3102 of the first mold 300 may be inclined at an angle ($\Theta_1$) of 30 degrees to 60 degrees with respect to the bottom surface of the bottom chassis 250.

The internal surface of the side wall 3103 of the first mold 300 is formed in a vertical position. The external surface of the side wall 3103 of the first mold 300 consists of a horizontal base plane 3103a that protrudes from the external surface in a horizontal direction, and a reverse-inclined surface 3103b extending downwardly from the upper surface 3101 at an angle toward the interior side of the first mold 300. The horizontal base plane 3103a protrudes outwards past the external surface of the upper surface 3101. The bottom side of the first mold 310 is opened and an empty space is formed in an area defined by the sloping surface 3102, the upper surface 3101 and the side wall 3103.

The first side portion 410 in the second mold 400 is placed on the horizontal base plane 3103a of the first side portion 310 in the first mold. The first side portion 410 in the second mold 400 includes a supporting portion 4101 protruding inwards to cover the optical plate 230 and/or the optical sheet layer 240 and supporting the LCD panel 110. The outermost surface of the first side portion 410 protrudes past the outermost surface of the side wall 3103 of the first mold, for example, past an end of the horizontal base plane 3103a. In addition, the external surface of the first side portion 410 in the second mold 400 has an undercut surface 4102, which is indented with respect to the outermost surface of the second mold 400. That is, the external surface of the first side portion 410 has an indented step.

The top chassis 600 covers the edges of the LCD panel 110 and surrounds lateral surfaces of the respective first side portions 310 and 410 of the first and second molds 300 and 400, respectively. The side wall of the top chassis 600 is disposed in close proximity to the outermost surface of the first side portion 410 in the second mold 400 and is separated from the outermost surface of the first side portion 410 by a space through which the data TCP 130 can pass. Accordingly, a space is created between the side wall of the top chassis 600 and the undercut surface 4102 formed on the first side portion 410 of the second mold 400. This space corresponds to a receiving space for receiving the data driver IC 135. A space created between the side wall of the top chassis 600 and the reverse-inclined surface 3103b corresponds to a receiving space for receiving the PCB 140.

In more detail, the data TCP 130 and the PCB 140 attached to the first side portion of the LCD panel 110 are bent to the first side portions 310 and 410 of the first and second molds 300 and 400, respectively, and then combined with the top chassis 600, thereby forming the receiving space for receiving the data driver IC 135 between the side wall of the top chassis 600 and the undercut surface 4102 formed on the first side portion 410 of the second mold 400, and the receiving space for receiving the PCB 140 between the side wall of the top chassis 600 and the reverse-inclined surface 3103b. Here, the vertical cross section of the receiving space between the side wall of the top chassis 600 and the reverse-inclined surface 3103b of the side wall 3103 of the first side portion 310 in the first mold, has the shape of a trapezoid having a width increasing in the downward direction. Meanwhile, connection wires (not shown) are primarily arranged on an interface area between the PCB 140 and the data TCP 130 and driver chips 141 are mounted on an area far from the interface area between the PCB 140 and the data TCP 130 and driver chips 141. Accordingly, the driver chips 141 of the PCB 140 would be positioned on the relatively wide end of the trapezoidal area while the connection wires would be positioned on the narrow end of the trapezoidal area. In such a manner, utilization of the receiving space can be maximized.

That is to say, the bottom surface of the PCB 140 is disposed on the reverse-inclined surface 3103b of the side wall 3103 of the first side portion 310 in the first mold 300 while the driver chips 141 are positioned on the relatively wide area. In this case, the upper surface of each of the driver chips 141 contributes less to the width of the side wall of the top chassis 600 than in the case where the PCB 140 is disposed in a vertical position. As such, the side wall of the top chassis 600 can be made narrower. As a result, the dimension $d_1$ of the top surface of the top chassis 600, which is not associated with displaying an image, is reduced. In addition, since the data driver IC 135 protruding from the data TCP 130 is accommodated in the space between the side wall of the top chassis 600 and the undercut surface 4102 formed on the first side portion 410 of the second mold 400, the dimension $d_1$ of the top surface of the top chassis 600 is further reduced or can be maintained at the same level.

If the dimension $d_1$ of the top surface of the top chassis 600 is reduced, a ratio of the display area to the overall screen display area of the liquid crystal display 700 increases, thereby realizing a relatively large-screen display image in a liquid crystal display of the same dimensions. In a case where a plurality of LCD panels are arranged adjacent to each other to construct a tiled monitor liquid crystal display, a variance in the non-display area between each of the respective LCD panels is reduced, thereby achieving a further enhanced image quality.

Figure 4:
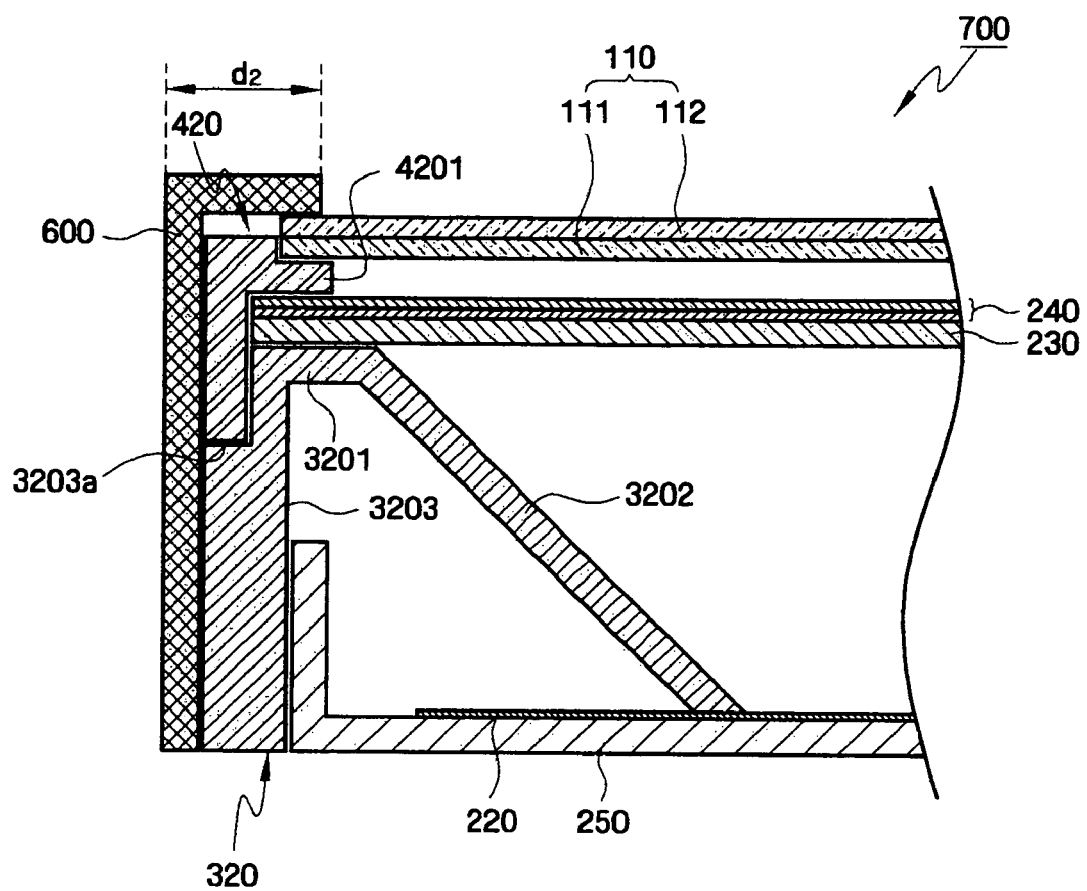
FIG. 4 is a cross-sectional view taken along line IV-IV' of FIG. 2, illustrating a second side portion of the liquid crystal display shown in FIG. 1.

FIG. 4 is a cross-sectional view taken along line IV-IV' of FIG. 2, illustrating a second side portion of the liquid crystal display (700) shown in FIG. 1. Referring to FIGS. 1, 2 and 4, unlike the first side portion 310 of the liquid crystal display 700 shown in FIG. 1, to which the data TCP 130 and the PCB 140 are attached, the second side portion 320 of the liquid crystal display 700 shown in FIG. 1 has neither a data TCP nor a PCB attached thereto. Accordingly, it is not necessary to form a receiving space, unlike in the first side portion 310. In other words, a sloping portion 3202 and an upper surface 3201 of the second side portion 320 are substantially the same as the sloping portion 3102 and an upper surface 3101 of the first side portion 310. However, a reverse-inclined surface is not necessarily provided in a side wall 3203 of the second side portion 320 in the first mold 300. A second side portion 420 in the second mold 400 includes a supporting portion 4201 at the interior side of its side wall. However, unlike the first side portion 410, an external surface of the second side portion 420 has no cutout surface. That is, the external surface extends downwardly from a horizontal base plane on which the second mold 400 is placed. The external surface of the side wall 3203 of the second side portion 320 in the first mold 300 and the external surface of the second side portion 420 in the second mold 400 are substantially aligned with each other. In the second side portion 420, the side wall of the bottom chassis 250 is inserted from an opened bottom surface of the second side portion 320 in the first mold 300 between a sloping portion 3202 and a side wall 3203 of the second side portion 320 in the first mold 300. No receiving space is necessary at the exterior side of the side wall 3203 of the second side portion 320 in the first mold 300. Further, the external surface of the side wall 3203 of the second side portion 320 in the first mold 300 and the external surface of the second side portion 420 in the second mold 400 are disposed in close proximity to the side wall of the top chassis 600. Accordingly, a dimension $d_2$ of a top surface of the top chassis 600 can be further reduced. As a modified example of the present embodiment, the second side portions 320 and 420 of the first mold 300 and the second mold 400 may be configured to have substantially the same width as the first side portions 310 and 410 of the first mold 300 and the second mold 400, respectively, from the viewpoint of simplicity of the manufacturing process.

Figure 5:
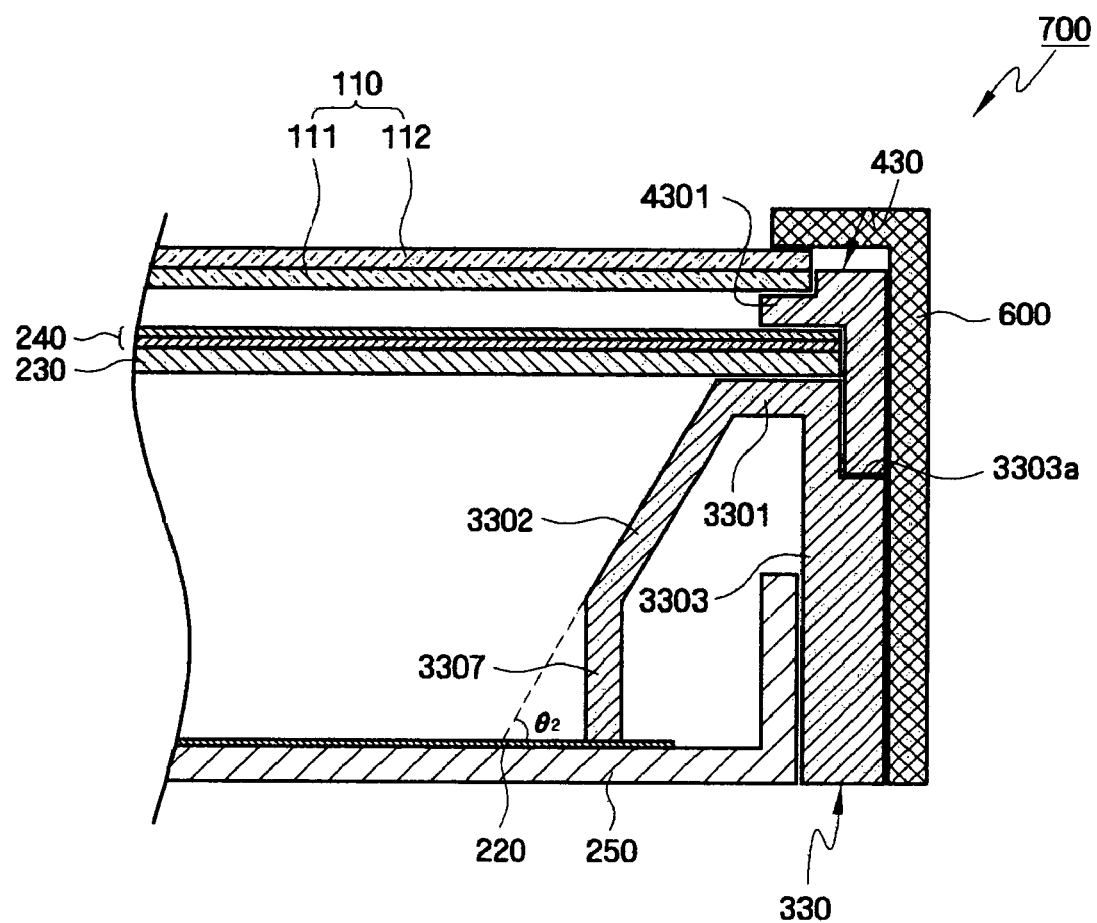
FIG. 5 is a cross-sectional view taken along line V-V' of FIG. 2, illustrating a third side portion of the liquid crystal display shown in FIG. 1.

FIG. 5 is a cross-sectional view taken along line V-V' of FIG. 2, illustrating a third side portion of the liquid crystal display (700) shown in FIG. 1. Referring to FIGS. 1, 2, and 5, the light source 210 is received in the third side portion of the liquid crystal display 700. That is to say, the internal configuration of the third side portion 330 in the first mold 300 is different from that of the first or second side portion 310 or 320. The third side portion 330 in the first mold 300 is similar to the second side portion 320 in that neither a data TCP nor a PCB is attached thereto. That is, the external configuration of the third side portion 330 in the first mold 300 is substantially the same as that of the second side portion 320.

In more detail, the third side portion 330 in the first mold 300 includes an upper surface 3301, a sloping surface 3302 inclined downwardly from the upper surface 3301, and a side wall 3303. Since the light source 210 is received in the third side portion 330, it is not necessary to separately provide a reflection plane in an area where the light source 210 is received. Thus, a vertical plane 3307 is disposed in the area where the light source 210 is received. The sloping surface 3302 extends upwardly from the vertical plane 3307. In addition, the sloping surface 3302 is vertical to the long axis of the light source 210, which means that an amount of light directly incident from the light source 210 is small. Thus, a downward inclination angle ($\ominus_2$) of the sloping portion 3302 does not need to be gentle, unlike in the first side portion 310. Meanwhile, the greater the downward inclination angle $\ominus_2$ of the sloping portion 3302 with respect to the bottom chassis 250, the narrower the distance between the side wall of the bottom chassis 250 and the vertical plane 3307. This is advantageous in acquiring an exposure area of the light source 210. Therefore, the sloping portion 3302 is preferably inclined with respect to the bottom chassis 250 at a relatively large downward inclination angle $\ominus_2$ within a range in which reflection efficiency is not unduly declined, for example, in a range of about 60 degrees to about 80 degrees.

Additionally, since the shape of the third side portion 430 in the second mold 400 including a supporting portion 4301, and the shapes of the external surface of a side wall 3303 of the third side portions 330 in the first mold 330 are substantially the same as those of the second side portion, explanations thereof will not be given. Meanwhile, although not shown in the drawings, a fourth side portion may also be formed to be symmetrical with the third side portion.

Next, liquid crystal displays according to other embodiments of the present invention will be described. In the following, the invention will be described with regard to cross sections of characteristic side portions of the liquid crystal displays. The side portions which are not specifically discussed in the following exemplified embodiments are substantially the same as those shown in the first embodiment. However, the invention is not limited to the illustrated example and it is to be understood that a combination of the illustrated side portions can be applied to the invention. In the following embodiments, in each case where structures the same as those of the first embodiment are denoted by the same reference numerals, overlapping descriptions will be omitted or simplified.

Figure 6:
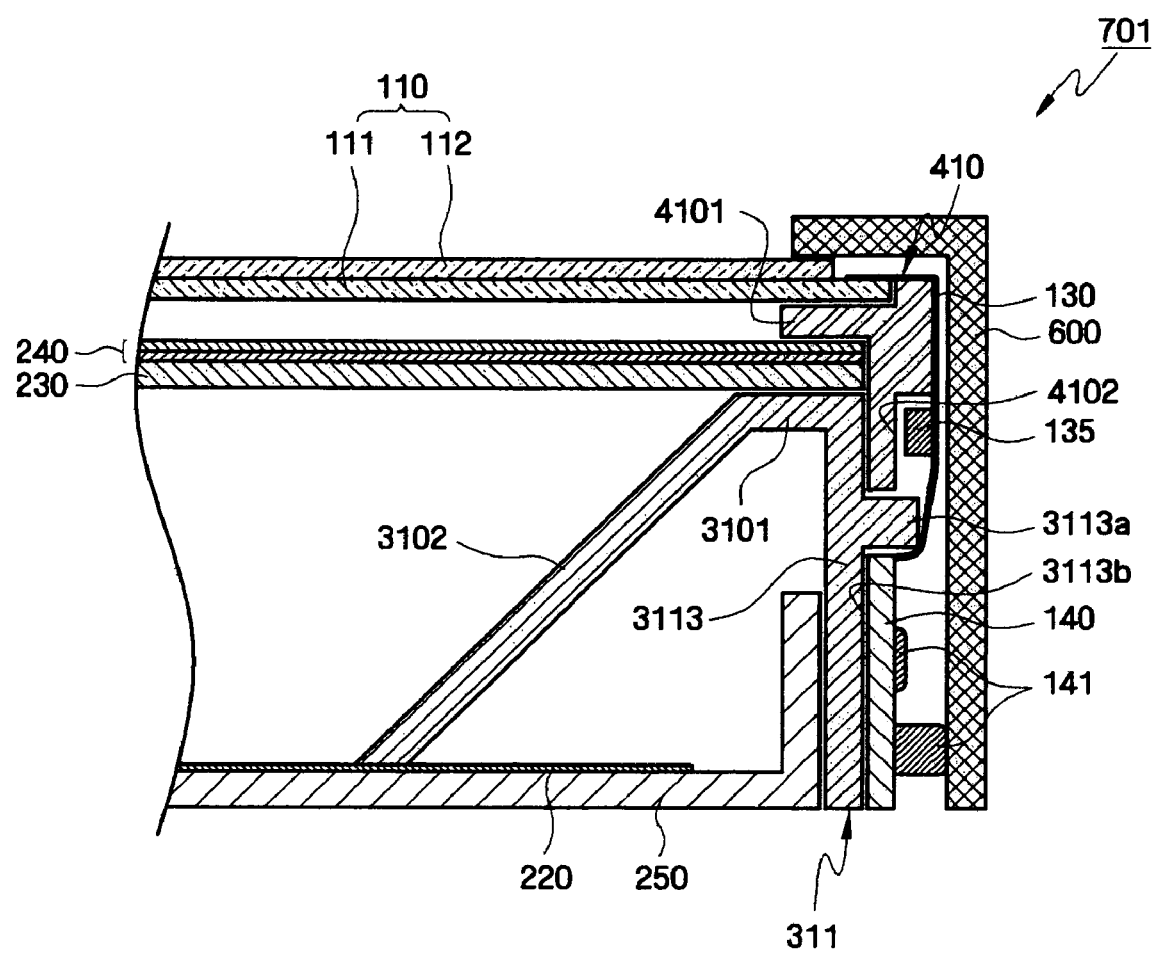
FIG. 6 is a cross-sectional view illustrating a first side portion of a liquid crystal display according to a second embodiment of the present invention.

FIG. 6 is a cross-sectional view illustrating a first side portion of a liquid crystal display (701) according to a second embodiment of the present invention.

Referring to FIG. 6, the first side portion of the liquid crystal display 701 according to the second embodiment of the present invention is substantially the same as that of the first embodiment shown in FIG. 3 except for the shape of a side wall 3113 formed in a first mold 311. In detail, the upper surface 3101, the sloping surface 3102 and the internal surface of the side wall 3113 are substantially the same as those of the first mold 311. However, the current embodiment is different from the first embodiment in that a protrusion 3113a is formed on the external surface of the side wall 3103. In more detail, the external surface of the side wall 3103 has the protrusion 3113a that horizontally protrudes from an external vertical plane extending vertically from the upper surface 3101, and an undercut surface 3113b, which is cut from the lower portion of the protrusion 3113a to be formed in a vertical position. The external vertical plane and the undercut surface 3113b may be aligned on the same line. Alternatively, any one of the two may be disposed much exterior to the other, if needed. The positional relationship between the external vertical plane and the undercut surface 3113b is determined by the strength of the first mold 311, the dimension of driver chips 141 mounted on a PCB 140, and so on. The lower end of a second mold 410 may overlie the upper surface of the protrusion 3113a. The shape of the second mold 410 is substantially the same as that of the first embodiment of the present invention.

A space created between the side wall of the top chassis 600 and the undercut surface 4102 formed on the second mold 410 corresponds to a receiving space for receiving a data driver IC 135. A space created between the undercut surface 3113b of the first mold 311 and the side wall of the top chassis 600 corresponds to a receiving space for receiving the PCB 140. The lower end of the PCB 140 is disposed on the undercut surface 3113b of the first mold 311. Accordingly, the current embodiment provides a wider receiving space to the PCB 140 than the first embodiment. In particular, even when the driver chips 141 are mounted on an interface area between the PCB 140 and the data TCP 130, the invention can be advantageously applied because the dimension of the receiving space is the same irrespective of the position, at either the upper end or the lower end of the receiving space.

Figure 7:
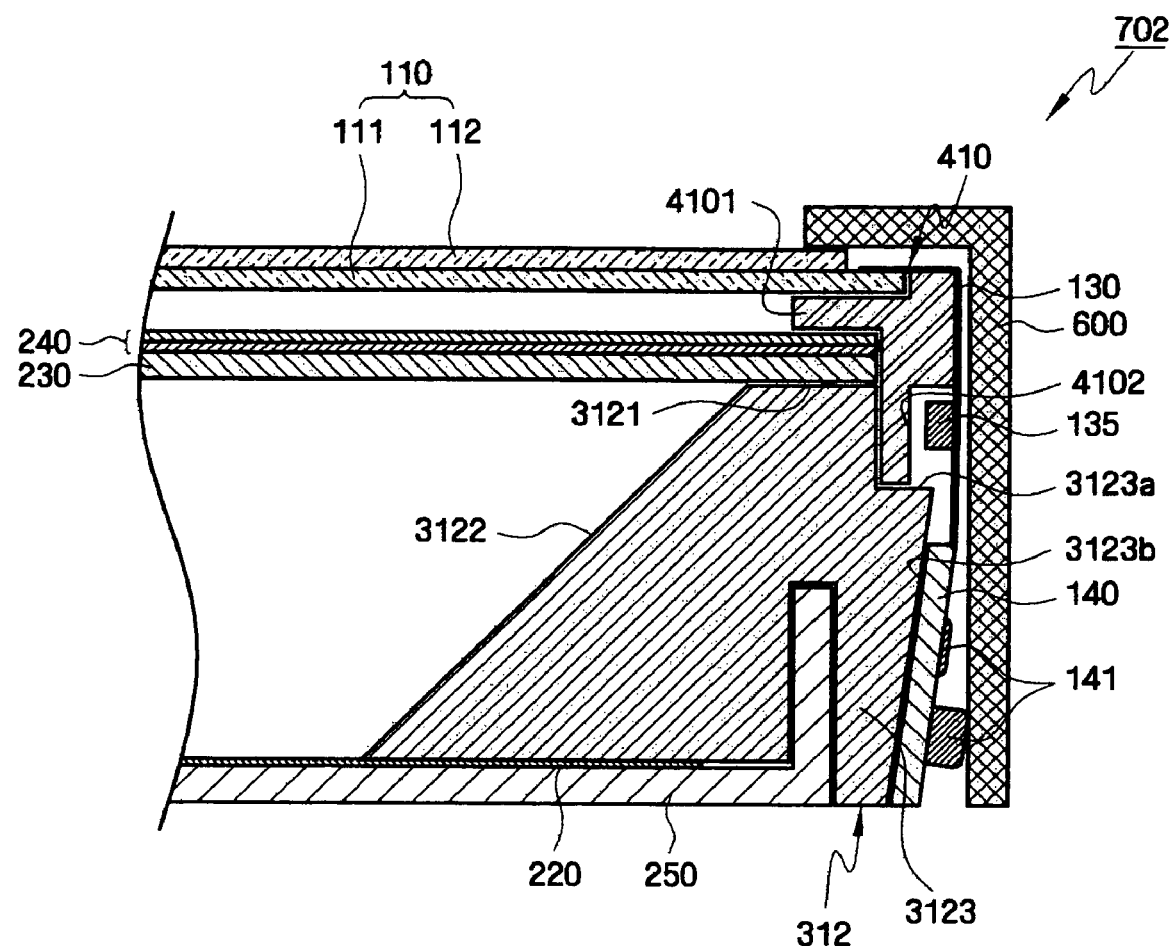
FIG. 7 is a cross-sectional view illustrating a first side portion of a liquid crystal display according to a third embodiment of the present invention.

FIG. 7 is a cross-sectional view illustrating a first side portion of a liquid crystal display (702) according to a third embodiment of the present invention.

Referring to FIG. 7, the first side portion of the liquid crystal display 702 according to the third embodiment of the present invention is different from that of the first embodiment in that an empty space is not formed in the lower portion of a first mold 312 and the inside of the first mold 312 is fully packed. In detail, an upper surface 3121, a sloping surface 3122 and external surfaces 3123a and 3123b of a side wall 3123 are substantially the same as those of the first embodiment. However, unlike in the first embodiment in which the bottom side of the first mold is opened, the current embodiment is different from the first embodiment in that the empty space is filled with a solid medium, e.g., a resin material forming the first mold 312. In this case, since the bottom surface of the first mold 312 is entirely brought into contact with a reflection sheet 220 and/or a bottom chassis 250, movement of the reflection sheet 220 can be more effectively prevented. In addition, since the inside of the first mold 312 is filled with resin, the overall strength of the first mold 312 and resistance against external shock can be increased.

Figure 8:
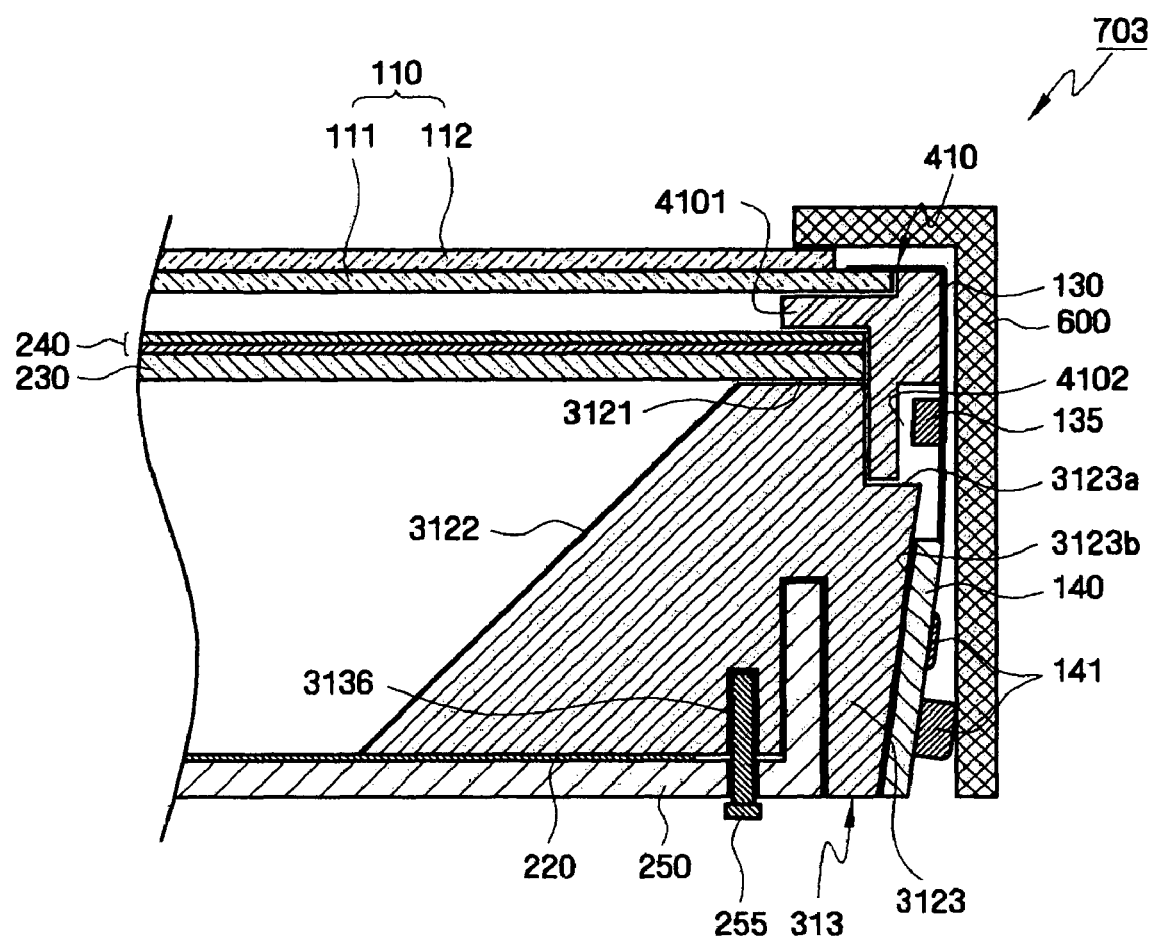
FIG. 8 is a cross-sectional view illustrating a first side portion of a liquid crystal display according to a fourth embodiment of the present invention.

FIG. 8 is a cross-sectional view illustrating a first side portion of a liquid crystal display (703) according to a fourth embodiment of the present invention.

Referring to FIG. 8, the first side portion of the liquid crystal display 703 according to the fourth embodiment of the present invention is different from that of the third embodiment in that a locking slot 3136 is formed on a bottom surface of a first mold 313. Further, a locking groove passing through the locking slot 3136 is formed on the bottom surface of a bottom chassis 250, thereby facilitating connection between the bottom chassis 250 and the first mold 313 by means of a connection member 255, such as a nail, a thread, a screw, or the like. In some of the illustrated embodiments, the invention has been described with regard to hook connection between the first mold and the bottom chassis, specifically between the side wall of the first mold and the side wall of the bottom chassis. However, by connecting the first mold 313 with the bottom surface of the bottom chassis 250 using, e.g., a screw, like in the current embodiment, the first mold 313 can be more easily disassembled from the bottom chassis 250. For example, when replacement or repair of the reflection sheet 220 or the light source 210 is needed, the reflection sheet 220 and the light source 210 can be simply replaced or repaired by removing a screw to remove the connection between the first mold 313 and the bottom chassis 250. Upon disconnecting the first mold 313 from the bottom chassis 250, the reflection sheet 220 and the light source 210 are exposed to be readily replaced or repaired. In the exemplary embodiments of the present invention, since the first mold is formed as a single piece frame by first through fourth side portions and the first mold is combined with the second mold and/or the top chassis, other components, that is, an optical plate and/or optical sheets disposed at the upper portion of the liquid crystal display, are received in normal positions even when the first mold and the bottom chassis are disassembled from each other.

As a modified example of the present embodiment, unlike in the first through third embodiments of the present invention in each of which the lower space of the first mold is not filled with a resin material, a locking slot may be formed at a lower end of the side wall, thereby enabling the first mold to be locked from the bottom surface of the bottom chassis by means of, e.g., a screw.

Figure 9:
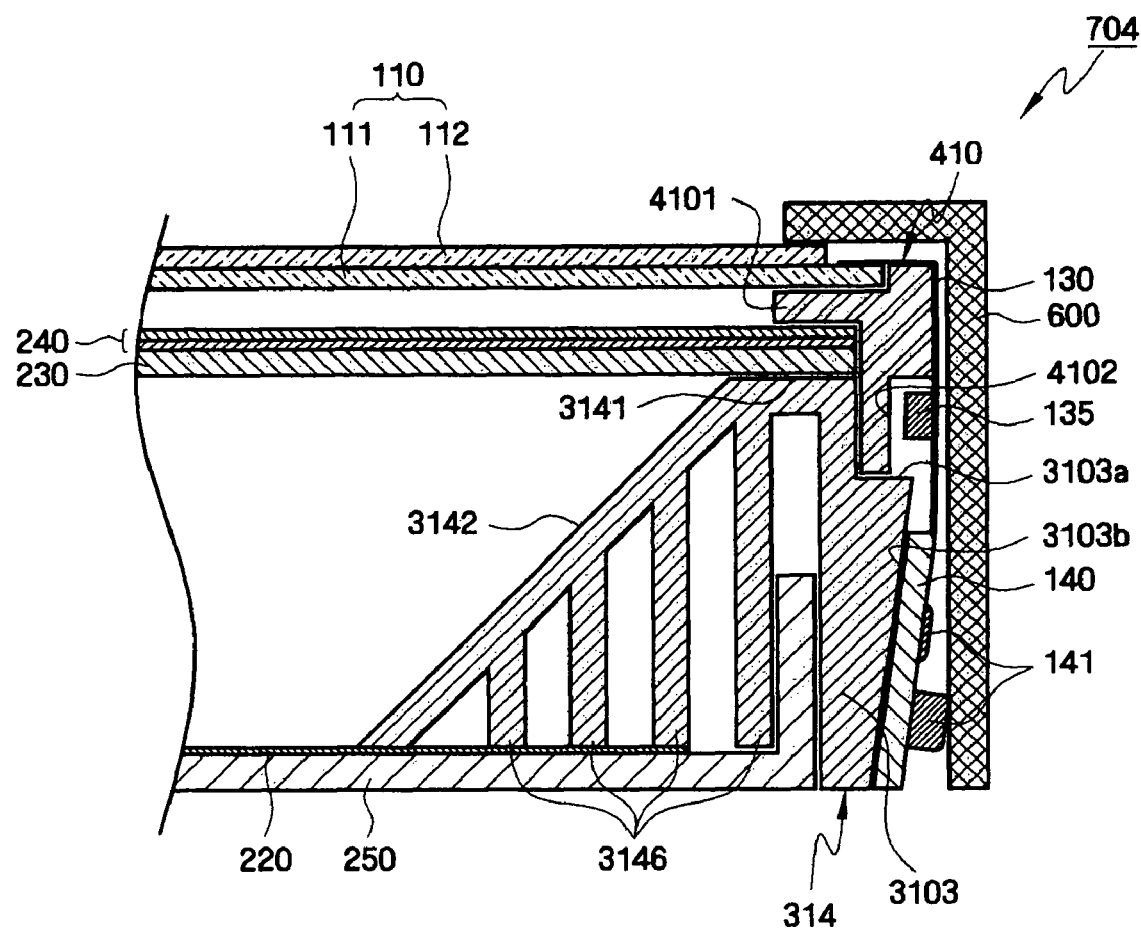
FIG. 9 is a cross-sectional view illustrating a first side portion of a liquid crystal display according to a fifth embodiment of the present invention.

FIG. 9 is a cross-sectional view illustrating a first side portion of a liquid crystal display (704) according to a fifth embodiment of the present invention.

Referring to FIG. 9, the first side portion of the liquid crystal display 704 according to the fifth embodiment of the present invention is different from that of the first embodiment in that a support rib 3146 is formed in an opened empty space of a first mold 314. In detail, at least one support rib 3146 extends from the side opposite to a sloping surface 3142 and/or an upper surface 3141 to a reflection sheet 220 and/or the bottom surface of a bottom chassis 250. The lower end of the support rib 3146 pressurizes the reflection sheet 220 together with the lower end of the sloping surface 3142, thereby more efficiently preventing movement of the reflection sheet 220. In addition, the support rib 3146 further increases the strength of the first mold 314, thereby further increasing resistance of a backlight assembly against external shock. Further, although not shown in the drawings, as a modified example of the present embodiment, at least one support rib may be provided in at least one among first through fourth side portions of a liquid crystal display of the present invention.

Figure 10:
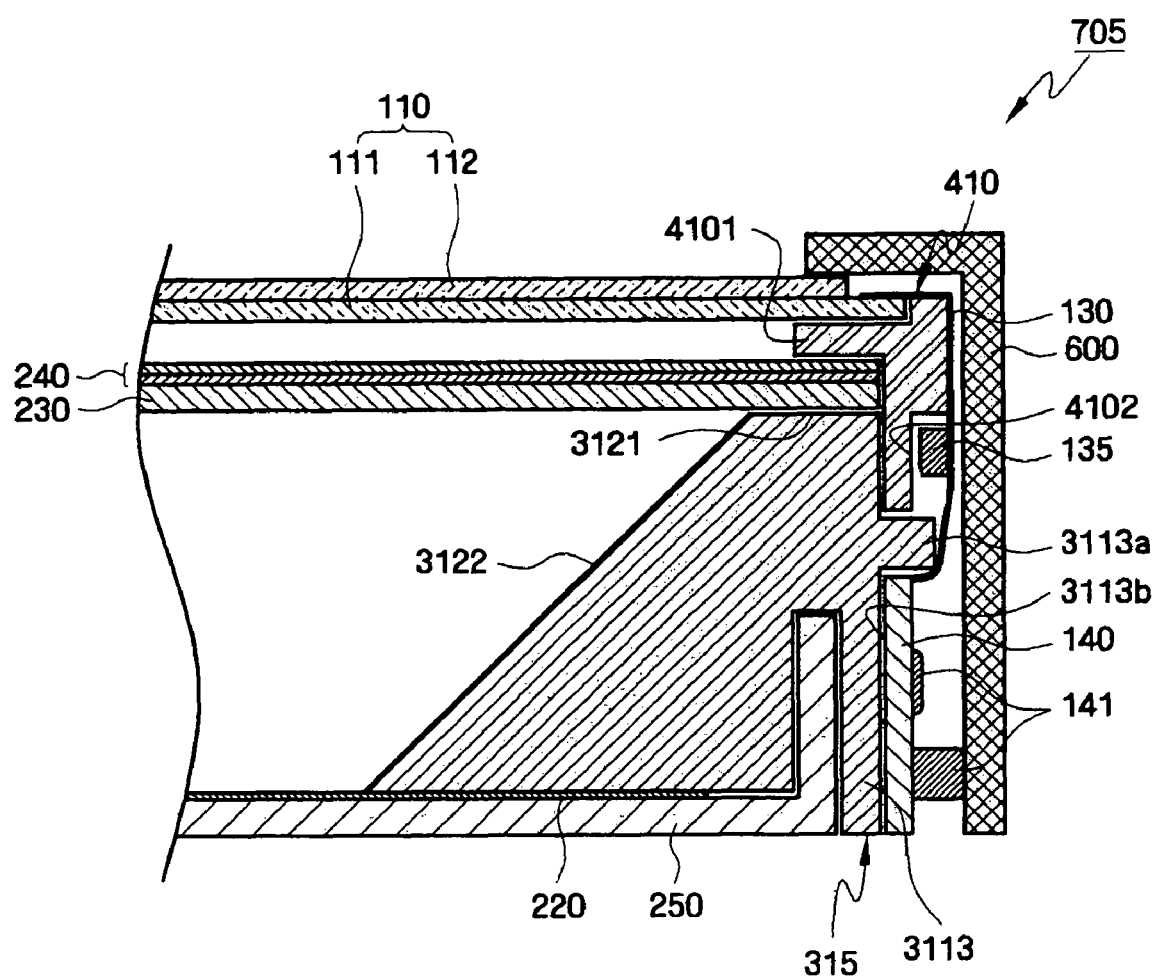
FIG. 10 is a cross-sectional view illustrating a first side portion of a liquid crystal display according to a sixth embodiment of the present invention.

FIG. 10 is a cross-sectional view illustrating a first side portion of a liquid crystal display (705) according to a sixth embodiment of the present invention, illustrating one or more possible combinations of the previous embodiments of the present invention. As shown in FIG. 10, a first mold 315 of the liquid crystal display 705 according to the current embodiment of the present invention has a side wall having the same external shape as that of the first mold according to the second embodiment (see 311 of FIG. 6). In addition, the current embodiment is similar to the third embodiment in that the inside of the first mold 315 is filled with a resin material, like the first mold according third embodiment (see 312 of FIG. 7). By doing so, the respective merits or effects obtained in the second and third embodiments can both be achieved by the current embodiment.

Figure 11:
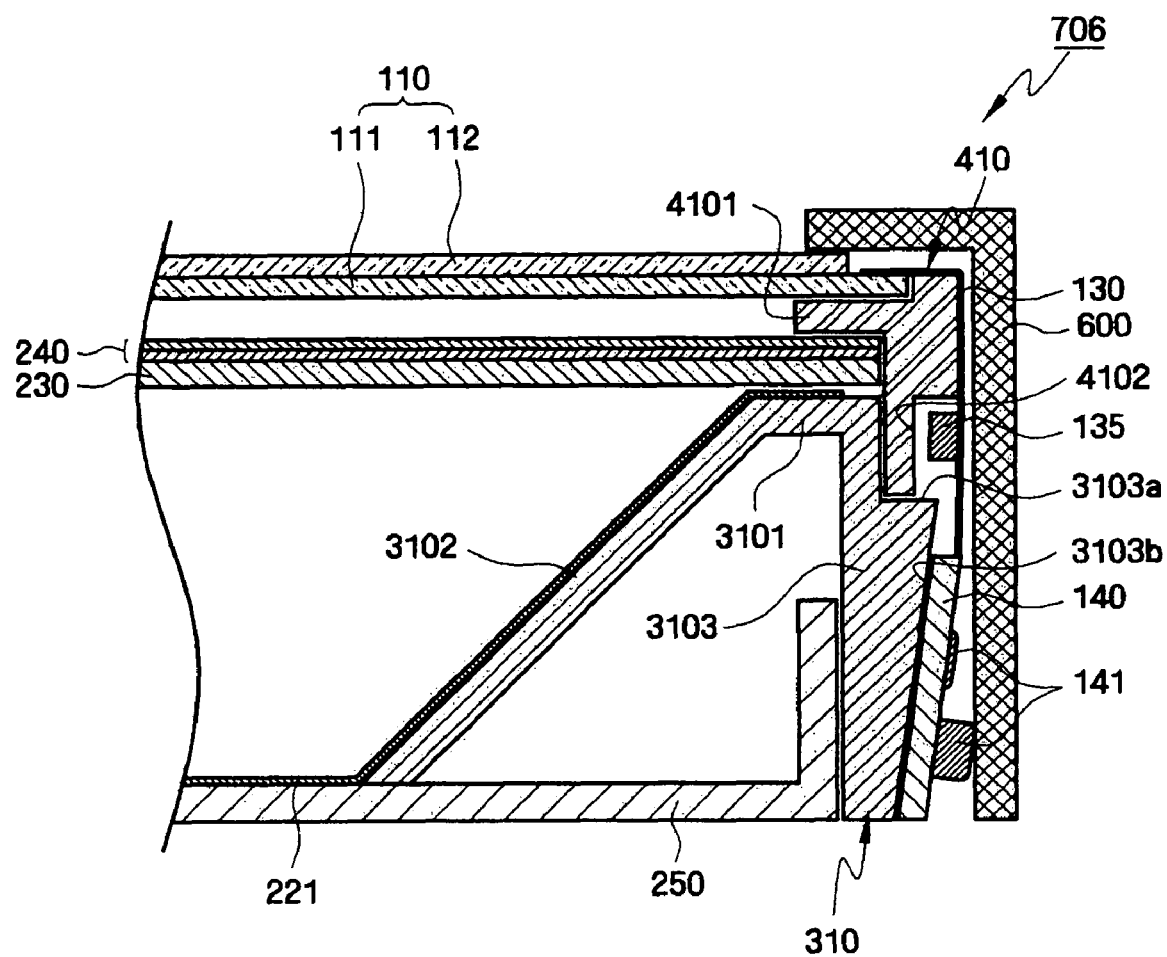
FIG. 11 is a cross-sectional view illustrating a first side portion of a liquid crystal display according to a seventh embodiment of the present invention.

While the exemplary embodiments of the present invention have been described and illustrated with regard to a reflection sheet having a flat surface without a refractive plane, the reflection sheet being inserted into a lower portion of a sloping surface of the first mold and pressurized by the sloping surface of the first mold, the invention is not limited to the illustrated examples. A reflection sheet 221 may be bent along the sloping surface 3102 and the reflection sheet 221 may cover the sloping surface 3102 of the first mold 310. An example of is illustrated in FIG. 11. FIG. 11 is a cross-sectional view illustrating a first side portion of a liquid crystal display (706) according to a seventh embodiment of the present invention.

Referring to FIG. 11, the shape of the first mold 310 is substantially the same as that according to the first embodiment of the present invention. The reflection sheet 221 is refracted along the sloping surface 3102 and extends up to an upper surface 3101 of the first mold 310. Preferably, the reflection sheet 221 is attached to the upper surface 3101 of the first mold 310 by an adhesive, etc. In this case, since the reflection sheet 221 completely covers the sloping surface 3102 of the first mold 310, reflection efficiency may be increased. In addition, the first mold 310 is not necessarily made of a highly reflective material so long as it is made of a resin material having a commonly acceptable strength. Further, since the reflection sheet 221 is attached to the upper surface 3101 of the first mold 310, movement of the reflection sheet 221 can be more efficiently prevented. Although not shown in the drawings, it will be apparent to those of ordinary skill in the art that the shapes and attachment methods of the reflection sheets which have been described in the exemplary embodiments of the present invention can also be applied to other embodiments.

Figure 12:
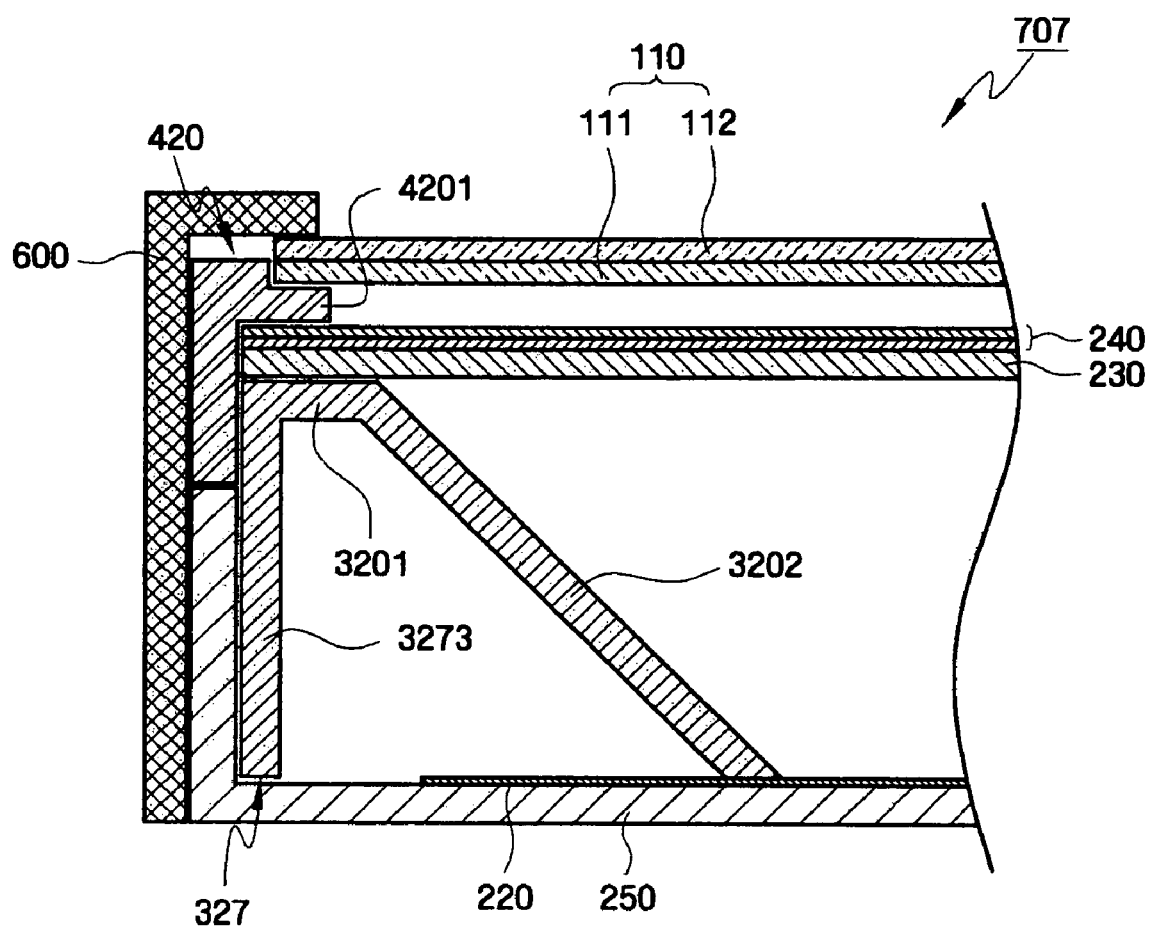
FIG. 12 is a cross-sectional view illustrating a second side portion of a liquid crystal display according to an eighth embodiment of the present invention.

FIG. 12 is a cross-sectional view illustrating a second side portion of a liquid crystal display (707) according to an eighth embodiment of the present invention. As shown in FIG. 12, the liquid crystal display 707 according to the current embodiment of the present invention is different from the liquid crystal display (700 of FIG. 4) according to the first embodiment in that a first mold 327 is disposed at the interior side with respect to a side wall of a bottom chassis 250. That is to say, the first mold 327, the bottom chassis 250 and a top chassis 600 are sequentially disposed to be close to each other. In this case, it is not necessary to provide a horizontal base plane on the external surface of a side wall 3273 of the first mold 327. Rather, the external surface of the side wall 3273 may be formed as a vertical plane. According to the current embodiment, since the bottom chassis 250 and the top chassis 600 are disposed to be close to each other, the connection between the bottom chassis 250 and the top chassis 600, which are external surface components of the liquid crystal display 707, can be strengthened.

Figure 13:
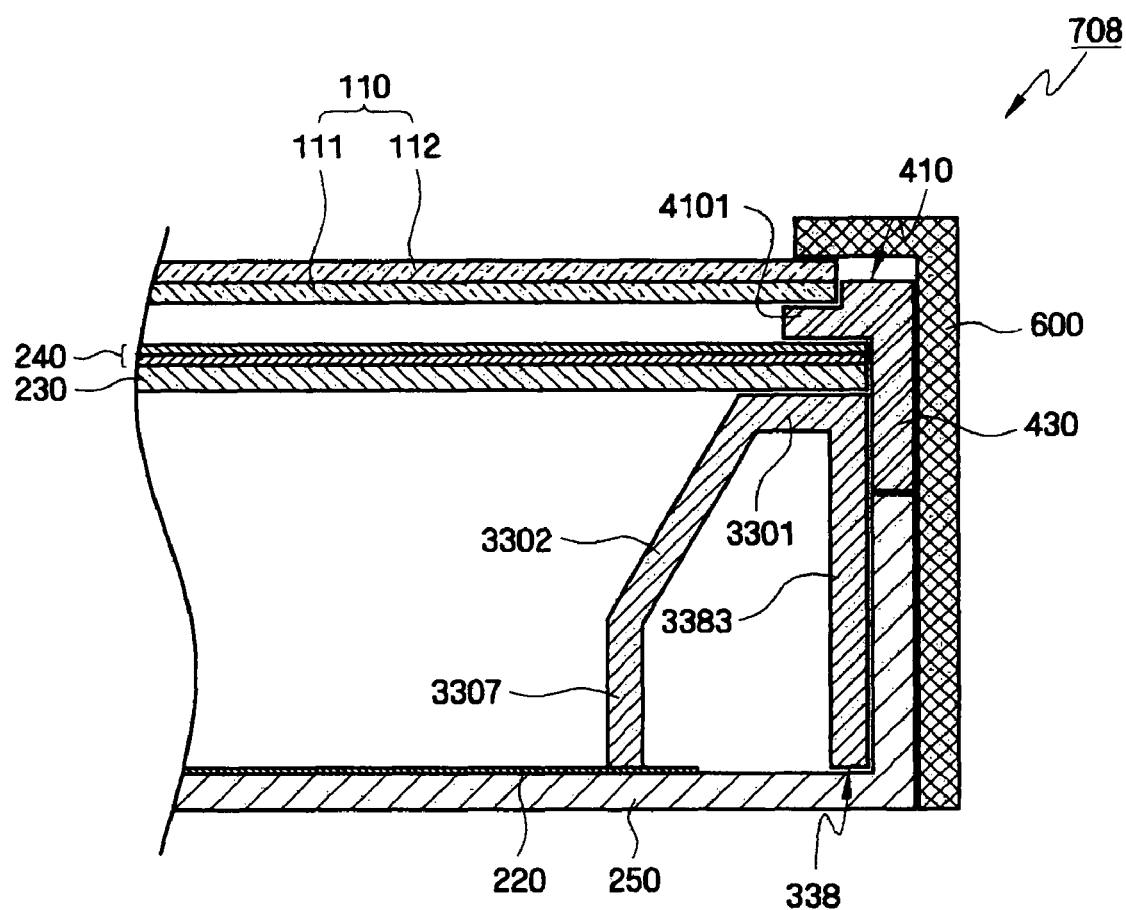
FIG. 13 is a cross-sectional view illustrating a third side portion of a liquid crystal display according to a ninth embodiment of the present invention.

FIG. 13 is a cross-sectional view illustrating a third side portion of a liquid crystal display (708) according to a ninth embodiment of the present invention. Referring to FIG. 13, the liquid crystal display 708 according to the current embodiment of the present invention is different from the liquid crystal display (700 of FIG. 5) according to the first embodiment in that a first mold 338 is disposed at the interior side with respect to a side wall of a bottom chassis 250. In this case, the lower end of a second mold 430 overlies the side wall of the bottom chassis 250, and the external surface of a side wall 3383 of the first mold 338 may be formed as a vertical plane.

Figure 14:
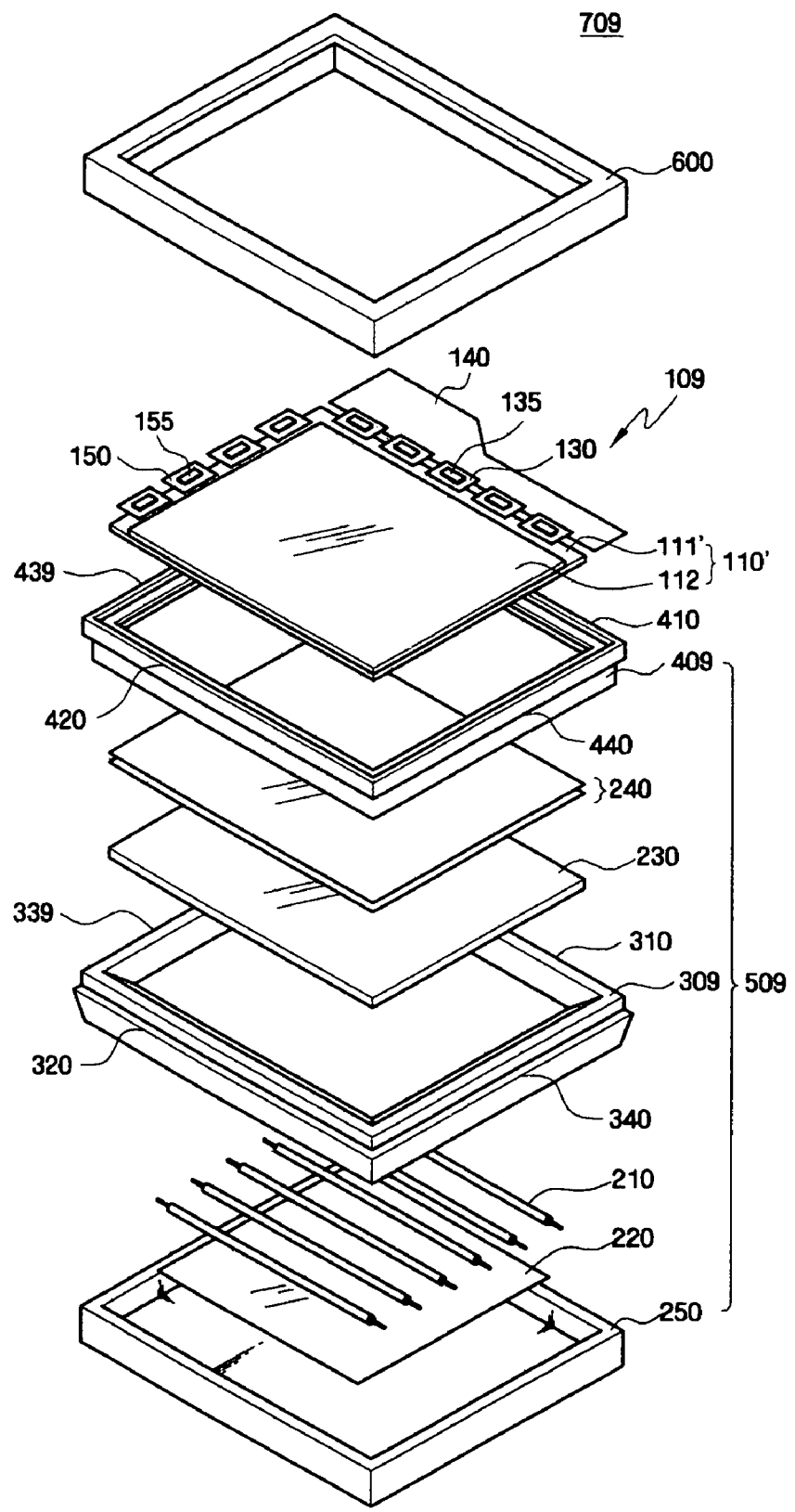
FIG. 14 is an exploded perspective view illustrating a liquid crystal display according to a tenth embodiment of the present invention.
Figure 15:
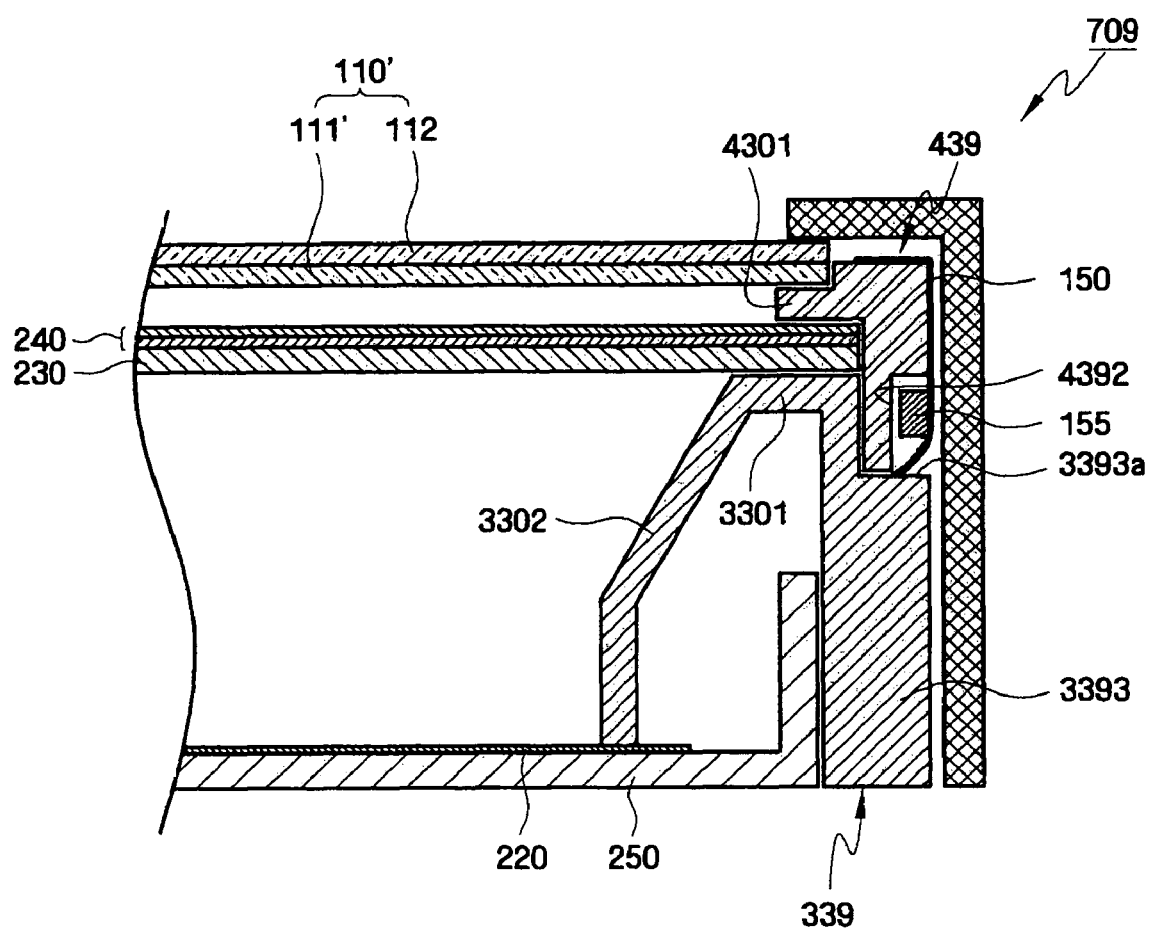
FIG. 15 is a cross-sectional view illustrating a third side portion of the liquid crystal display shown in FIG. 14.

FIG. 14 is an exploded perspective view illustrating a liquid crystal display (709) according to a tenth embodiment of the present invention and FIG. 15 is a cross-sectional view illustrating a third side portion of the liquid crystal display shown in FIG. 14.

Referring to FIG. 14, the liquid crystal display 709 according to the current embodiment of the present invention further includes a gate TCP 150 and a gate driver IC 155 in a third side portion, compared to the liquid crystal display (700 of FIG. 5) according to the first embodiment. Thus, in the third side portion, a first substrate 111' of an LCD panel 110' may be larger than a second substrate 112 in size. In addition, unlike in the first embodiment in which a gate line driver is formed, it is not necessary to separately provide a gate driver on the first substrate 111'.

Referring to FIG. 15, the liquid crystal display 710 according to the current embodiment of the present invention further includes a gate TCP 150 and a receiving space for receiving a gate driver IC 155, compared to the liquid crystal display(s) according to the previous embodiment(s). In detail, the gate TCP 150 and the gate driver IC 155 are to be bent and then received within a top chassis 600. To this end, a receiving space for receiving the gate driver IC 155 is provided between the top chassis 600 and a second mold 439, which is similar to the receiving space for accommodating the data driver IC 135 provided at the first side portion in the first embodiment as shown in FIG. 3. However, unlike in the previous embodiment, since a space for accommodating a PCB is not required, it is not necessary to provide a reverse-inclined surface at the external surface of a side wall 3393 of a first mold 339. That is to say, the external surface of the side wall 3393 of the first mold 339 has a first external vertical surface extending vertically from an upper surface 3301, a horizontal base plane 3393a that protrudes from the first external surface in a horizontal direction, and a second external surface extending vertically from the horizontal base plane 3393a. In addition, the external surface of the second mold 439 has an undercut surface 4392 that is cut from the outermost surface of the external surface of the second mold 439. The gate driver IC 155 is received in a space defined by the undercut surface 4392, the horizontal base plane 3393a of the first mold 339, and the top chassis 600. Meanwhile, in the current embodiment, a fourth side portion does not have a gate TCP and a gate driver IC, so that it may be formed to be symmetrical with the third side portion shown in FIG. 5.

As described above, according to the present invention, since the dimensions of a top surface of a top chassis, which is not associated with displaying of an image, are reduced, receiving spaces of a data driver IC and a PCB can be maximized. Accordingly, a ratio of the display area to the overall screen display area of a liquid crystal display increases, and the dimensions of a non-display area are reduced. Thus, although a display area has the same dimensions, a relatively large-screen display image can be obtained. In addition, since the invention can be applied to a case where a plurality of LCD panels are arranged adjacent to each other to construct a tiled monitor liquid crystal display, a variance in the non-display area between each of the respective LCD panels is reduced, thereby achieving satisfactory image quality.

While the present invention has been particularly shown and described with reference to exemplary embodiments thereof, it will be understood by those of ordinary skill in the art that various changes in form and details may be made therein without departing from the spirit and scope of the present invention as defined by the following claims. It is therefore desired that the present embodiments be considered in all respects as illustrative and not restrictive, reference being made to the appended claims rather than the foregoing description to indicate the scope of the invention.

What is claimed is:

1. A backlight assembly comprising:
a first mold comprising a frame including a plurality of side portions defining an opening;
a light source disposed in the opening; and
a second mold disposed over the first mold,
wherein an external surface of at least one of the side portions includes a horizontal base plane protruding outward from the external surface at a position on the external surface that is below an uppermost surface of the side portion and a reverse-inclined surface extending downwardly and inwardly from the horizontal base plane, and
wherein the second mold is disposed over the horizontal base plane of the first mold in the at least one side portion and an external surface of a sidewall of the second mold has an undercut surface that is cut inwardly from its outermost surface.

2. The backlight assembly of claim 1, wherein the external surface of the side portions of the first mold comprises a horizontal base plane protruding outwards past the external surface of an upper surface of the first mold, and the reverse-inclined surface extending downwardly from the horizontal base plane.

3. The backlight assembly of claim 2, wherein an internal surface of the side portions includes a sloping surface that extends from an upper surface of the first mold and is inclined downwardly toward the opening of the first mold.

4. The backlight assembly of claim 3, further comprising a bottom chassis including a plurality of sidewalls disposed under the light source and a reflection sheet supported on the bottom chassis,
wherein the first mold overlies the bottom chassis, and
further wherein one end of one of the sidewalls of the bottom chassis is inserted between the sloping surface and the external surface of the first mold, and the reflection sheet extends from the lower end of the sloping surface of the first mold to the sidewalls of the first mold.

5. The backlight assembly of claim 4, wherein the first mold comprises at least one locking slot formed on a bottom surface, and the first mold is engaged with the bottom chassis by means of a connection member.

6. The backlight assembly of claim 3, further comprising:
an optical plate and an optical sheet layer disposed on the upper surface of the first mold;
wherein the second mold partially covers the optical plate and the optical sheet layer.

7. A backlight assembly comprising:
a light source;
a first mold receiving the light source, the first mold comprising a frame having a plurality of side portions defining an opening, wherein at least one of the plurality of side portions include a first sidewall and an external surface of the first sidewall includes a horizontal base plane protruding outward from the external surface at a position on the external surface that is below an uppermost surface of the side portion and an undercut surface that is cut under the horizontal base plane inwardly from an outermost surface of the first sidewall; and
a second mold disposed over the first mold, wherein the second mold is disposed over the horizontal base plane of the first mold in the at least one side portion and an external surface of a sidewall of the second mold has an undercut surface that is cut inwardly from its outermost surface.

8. The backlight assembly of claim 7, wherein the external surface of the first sidewall includes a protrusion above the undercut portion, the protrusion extending outward past the external surface of an upper surface of the first mold and further wherein the first mold includes on an inner surface of the side portion a sloping surface that extends from the upper surface and is inclined downwardly toward the interior side of the side portion.

9. The backlight assembly of claim 8, further comprising:
an optical plate and an optical sheet layer disposed on the upper surface of the first mold;

wherein the second mold partially covers the optical plate and the optical sheet layer.

10. A backlight assembly comprising:
a light source;
a first mold receiving the light source, the first mold having a plurality of side portions defining an opening, wherein at least one of the plurality of side portions includes a first sidewall and an interior sloping surface that extends from an upper surface of a first side portion, the interior sloping surface being inclined downwardly toward the opening, and a bottom surface that is opened;
a bottom chassis receiving the light source and a reflection sheet, wherein the bottom chassis includes a portion that extends from the opened bottom surface of the first mold and is inserted to an area between the first sidewall of the first mold and the interior sloping surface of the first mold, and
a second mold disposed over the first mold,
wherein an external surface of the first sidewall includes a horizontal base plane protruding outward from the external surface at a position on the external surface that is below an uppermost surface of the side portion and a reverse-inclined surface that extends downwardly from the horizontal base plane,
wherein the second mold is disposed over the horizontal base plane of the first mold in the at least one side portion and an external surface of a sidewall of the second mold has an undercut surface that is cut inwardly from its outermost surface.

11. A liquid crystal display comprising:
a liquid crystal display panel assembly including a liquid crystal display panel, a data tape carrier package (TCP) attached to at least one side portion of the liquid crystal display panel, and a printed circuit board (PCB) attached to the data TCP and on which at least one driver chip is mounted;
a backlight assembly including
a first mold comprising a frame including a plurality of sidewalls defining an opening, and a light source disposed in the opening, wherein an external surface of the sidewalls includes a reverse-inclined surface extending downwardly and inwardly from an upper portion of the external surface; and
a top chassis covering edges of the liquid crystal display panel and surrounding lateral surfaces of the liquid crystal display panel and the backlight assembly,
wherein the PCB is received in a space defined by the reverse-inclined surface of the first mold and an inner surface of the top chassis, and the driver chip is facing the inner surface of the top chassis.

12. The liquid crystal display of claim 11, wherein a vertical cross section of the space defined by the reverse-inclined surface and the top chassis is in a shape so that the length of its lower portion is wider than that of its upper portion.

13. The liquid crystal display of claim 12, wherein the external surface of the-sidewalls of the first mold comprises a horizontal base plane protruding outwards past the external side of the upper surface of the first mold, and the reverse-inclined surface of the first mold extending downwardly from the horizontal base plane.

14. The liquid crystal display of claim 12, wherein an internal surface of the sidewalls includes a sloping surface that extends from an upper surface and is inclined downwardly toward the interior portion of the first mold.

15. The liquid crystal display of claim 14, further comprising a bottom chassis including a plurality of sidewalls disposed under the light source and a reflection sheet supported on the bottom chassis,
wherein the first mold overlies the bottom chassis, and
further wherein one of the sidewalls of the bottom chassis at one end is inserted between the sloping surface and the external surface of the first mold, and the reflection sheet extends from the lower end of the sloping surface of the first mold to the sidewalls of the first mold.

16. The liquid crystal display of claim 15, wherein the first mold comprises at least one locking slot formed on a bottom surface, and the first mold is engaged with the bottom chassis by means of a connection member.

17. The liquid crystal display of claim 14, further comprising:
an optical plate and an optical sheet layer disposed on the upper surface of the first mold; and
a second mold partially covering the optical plate and the optical sheet layer and disposed over the horizontal base plane of the first mold in the at least one side portion.

18. The liquid crystal display of claim 17, wherein an external surface of a sidewall of the second mold has an undercut surface that is cut inwardly from its outermost surface, and the data driver IC is received in a space defined by the undercut surface and the top chassis.

19. A liquid crystal display comprising:
a liquid crystal display panel assembly comprising a liquid crystal display panel, a data tape carrier package (TCP) attached to at least one side portion of the liquid crystal display panel, and a printed circuit board (PCB) attached to the data TCP and on which at least one driver chip is mounted;
a backlight assembly comprising a light source and a first mold receiving the light source, the first mold comprising a frame having a plurality of sidewalls defining an opening, wherein the plurality of sidewalls include a first sidewall and an external surface of the first sidewall includes an undercut surface that is cut inwardly from an outermost surface of the first sidewall; and
a top chassis covering edges of the liquid crystal display panel and surrounding lateral surfaces of the liquid crystal display panel and the backlight assembly,
wherein the PCB is received in a space defined by the first undercut surface of the first mold and an inner surface of the top chassis, and the driver chip is facing the inner surface of the top chassis.

20. The liquid crystal display of claim 19, wherein the external surface of the first sidewall includes a protrusion above the undercut portion, the protrusion protruding outward past the external side of an upper surface of the first mold, and further wherein the first mold includes on an inner surface a sloping surface that extends from the upper surface and is inclined downwardly toward the interior side of the sidewall.

21. The liquid crystal display of claim 20, further comprising:
an optical plate and an optical sheet layer disposed on the upper surface of the first mold; and
a second mold partially covering the optical plate and the optical sheet layer, supporting the liquid crystal display panel and disposed over the horizontal base plane of the first mold in the at least one side portion, wherein an external surface of a sidewall of the second mold has a second undercut surface that is cut inwardly from its outermost surface, and the data driver IC is received in a space defined by the second undercut surface and the top chassis.

22. A liquid crystal display comprising:

a liquid crystal display panel assembly comprising a liquid crystal display panel, a data tape carrier package (TCP) attached to at least one side portion of the liquid crystal display panel, and a printed circuit board (PCB) which is attached to the data TCP and on which at least one driver chip is mounted;

a backlight assembly comprising a light source, a first mold receiving the light source, the first mold having a plurality of side portions defining an opening, wherein the plurality of side portions includes a first sidewall and an interior sloping surface that extends from an upper surface of a first side portion, the interior sloping surface being inclined downwardly toward the opening, and a bottom surface that is opened in at least one side portion of the bottom surface, and a bottom chassis receiving the light source and a reflection sheet, wherein the bottom chassis includes a portion that extends from the opened bottom surface of the first mold and is inserted to an area between the first sidewall of the first mold and the interior sloping surface of the first mold; and a top chassis covering edges of the liquid crystal display panel and surrounding lateral surfaces of the liquid crystal display panel and the backlight assembly, wherein the PCB is received in a space defined by the reverse inclined surface of the first mold and an inner surface of the top chassis, and the driver chip is facing the inner surface of the top chassis, and wherein an external surface of the first sidewall includes a reverse-inclined surface that extends downwardly at an angle toward the opening and a width of the first side portion between the external surface and the interior sloping surface becomes wider downwardly.

* * * * *